United States Patent [19]
Harrison

[11] Patent Number: 6,154,485
[45] Date of Patent: Nov. 28, 2000

[54] RECEIVER IN A WIRELESS COMMUNICATIONS SYSTEM FOR RECEIVING SIGNALS HAVING COMBINED ORTHOGONAL TRANSMIT DIVERSITY AND ADAPTIVE ARRAY TECHNIQUES

[75] Inventor: Robert Mark Harrison, Grapevine, Tex.

[73] Assignee: Motorola, Inc., Schaumburg, Ill.

[21] Appl. No.: 09/175,050

[22] Filed: Oct. 19, 1998

[51] Int. Cl.[7] .................................................. H04B 1/69
[52] U.S. Cl. ........................................ 375/130; 375/267
[58] Field of Search .................................. 375/130, 140, 375/141, 146, 147, 267

[56] References Cited

U.S. PATENT DOCUMENTS

| 5,028,931 | 7/1991 | Ward | 342/383 |
| 5,467,367 | 11/1995 | Izumi et al. | 375/206 |
| 5,623,485 | 4/1997 | Bi | 370/209 |
| 5,764,690 | 6/1998 | Blanchard et al. | 375/206 |
| 5,956,368 | 9/1999 | Jamal et al. | 375/206 |

OTHER PUBLICATIONS

Kamyar Rohani and Louay Jalloul, "Orthogonal Transmit Diversity for Direct Spread CDMA", Contribution to European Telecommunications Standards Institute (ETSI) SMG2 dated Sep. 12, 1997.

Mark Harrison, "Transmit Adaptive Array Description, New Results, and Feedback Channel", Telecommunications Industry Association (TIA) Contribution Document #TR45.5.3.1/98.09.17.03, Sep. 17, 1999.

Primary Examiner—Temesghen Ghebretinsae
Attorney, Agent, or Firm—L. Bruce Terry

[57] ABSTRACT

A receiver for use in a wireless communication system, wherein the wireless communication system includes a transmitter that spreads data with multiple spreading codes. The receiver includes a plurality of despreaders for despreading with multiple despreading codes corresponding to the multiple spreading codes in the transmitter. A plurality of demodulators demodulate outputs of the plurality of despreaders, and a demultiplexer demultiplexes the outputs of the plurality of demodulators. A decoder decodes the output of the multiplexer to produce received traffic channel data. The receiver uses a pilot selector for selecting, in response to a control signal, a reference signal for use in the plurality of demodulators. A mode detector that produces the control signal is responsive to the transmitter transmitting in an orthogonal transmit diversity mode or an adaptive array mode.

2 Claims, 6 Drawing Sheets

RECEIVER IN A WIRELESS COMMUNICATIONS SYSTEM FOR RECEIVING SIGNALS HAVING COMBINED ORTHOGONAL TRANSMIT DIVERSITY AND ADAPTIVE ARRAY TECHNIQUES

FIELD OF THE INVENTION

The present invention relates generally to wireless communication systems, and more particularly to wireless communication systems using adaptive antenna arrays.

BACKGROUND OF THE INVENTION

Recently, wireless communication systems owners and operators have asked communication system designers to increase the capacity of wireless communication systems. This capacity, or the ability to carry user data, is what the operators sell to the system users. Therefore, increased capacity means increased profitability for communication system operators.

One method of improving capacity is to reduce the amount of energy needed to transmit a bit of information over the wireless air interface. Several methods of reducing the energy per bit have been proposed. Two of these proposals include transmitting user data using adaptive antenna arrays, and transmitting data using a method of transmission known as "orthogonal transmit diversity."

Transmitting user data with adaptive antenna arrays is a technique implemented by measuring the channel characteristics and modifying the gain and phase of signals applied to each element in an antenna array in order to create an antenna pattern that maximizes the power delivered to the subscriber unit. One of the disadvantages of adaptive array technology is the need for constant measurement and feedback of the channel characteristics and the subsequent recalculation of the adaptive array weights used to modify signals for each antenna element. The time needed to measure and compute the weights limits the speed at which the antenna pattern may be modified to compensate for a changing channel. Thus, when the subscriber travels at a higher speed, the channel changes at a rate higher than the rate of compensation in the adaptive antenna array. Thus, the feedback loop in the adaptive array technique cannot keep up with a quickly changing channel between the base station antenna and a higher-speed subscriber unit.

With regard to orthogonal transmit diversity, it is implemented by first converting a serial traffic channel into two or more parallel traffic channels using a multiplexer. If the traffic channel is converted into two parallel traffic channels, the two parallel traffic channels operate at one half the rate of the serial traffic channel input into the multiplexer.

Once the data is multiplexed, each parallel traffic channel is spread with a different spreading code to produce two or more spread traffic signals. These two spread traffic signals are then added together and transmitted from either a single antenna or separately transmitted from two or more separate antennas.

Some designers have proposed a communication system that switches from adaptive antenna transmission to orthogonal transmit diversity when the feedback required in adaptive antenna transmission begins to fail. A first problem with this mode switching proposal is that the receiver must be able to operate in two modes, where the adaptive array mode demodulates with one despreading code, and the orthogonal diversity mode demodulates with multiple codes despreading. Operating in two modes requires additional complexity in the receiver.

Because it is desirable to use a single receiver structure, it has been proposed that radio systems having orthogonal transmit diversity capabilities always transmit with multiple codes, even when transmit diversity is not active. Presently known transmitters using adaptive arrays presume that a single code spreads the transmitted data, which is a mode incompatible with the orthogonal transmit diversity proposal.

Another problem with the mode switching proposal is that the base station is required to send a message which tells the mobile which mode to use. Such messaging is slow in switching modes and requires additional mobile station circuitry or programming to implement.

Therefore, it should be apparent that there is a need for an improved method and system of transmitting and receiving a traffic channel using techniques from both orthogonal transmit diversity and adaptive antenna array transmission.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 1:
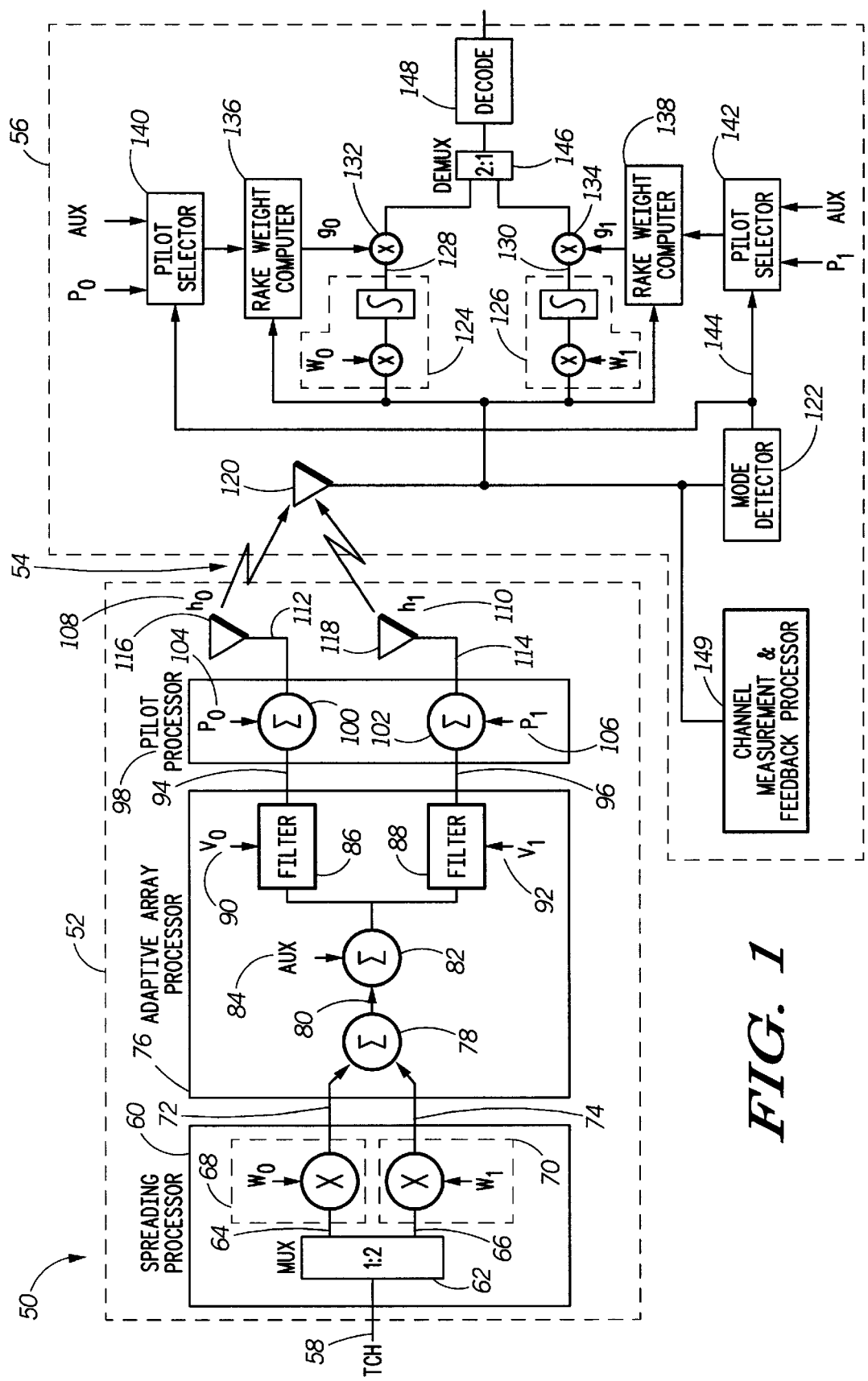
FIG. 1 depicts a wireless communications system in accordance with the method and system of the present invention.

With reference now to FIG. 1, there is depicted wireless communications system 50, which may be used to implement one embodiment of the method and system of the present invention. Wireless communication system 50 includes base transmitter 52, which transmits signals via communication channel 54 to subscriber unit 56. Note that FIG. 1 shows only the downlink of a communications system that may also include an uplink for duplex operation. An uplink may also be required for providing a feedback loop for data and commands for operating the downlink in an adaptive array mode.

Base transmitter 52 includes traffic channel 58, which is typically a serial data stream source of user data. Such data may represent voice signals or other user data, such as software, documents, images, facsimile data, or the like.

As shown, traffic channel 58 is coupled to spreading processor 60. Spreading processor 60 includes multiplexer 62, which is used to convert traffic channel 58 into two or more parallel traffic channels operating at a data rate that is inversely proportional to the number of traffic channels created by multiplexer 62. For example, as shown in FIG. 1, multiplexer 62 converts traffic channel 58 into two parallel traffic channels 64 and 66, each of which operates at one half the data rate of traffic channel 58, the input to multiplexer 62.

Parallel traffic channels 64 and 66 output by multiplexer 62 are coupled to spreaders 68 and 70, which spread the parallel traffic channels using spreading codes $W_0$ and $W_1$, as shown. The outputs of spreading processor 60 are spread traffic signals 72 and 74.

Spread traffic signals 72 and 74 are coupled to adaptive array processor 76, wherein, in the embodiment shown, they are added together by summer 78 to produce combined signal 80.

Combined signal 80 is coupled to the input of summer 82 for adding auxiliary pilot 84 to combined signal 80. Auxiliary pilot 84 is added so that subscriber unit 56 may use it as a reference for demodulating the received signal.

The output of summer 82 is split and coupled to filters 86 and 88, which filter the signal according to adaptive array weights 90 and 92 to produce element signals 94 and 96. Filters 86 and 88 may be implemented with a zero-delay, single-tap digital filter, which is equivalent to a complex multiplier.

Element signals 94 and 96 are coupled to pilot processor 98, which adds one or more pilot signals to element signals 94 and 96. As shown, summers 100 and 102 add element pilot signals 104 and 106, respectively, to element signals 94 and 96. Element pilot signals 104 and 106 are used by subscriber unit 56 to estimate or measure channel characteristics of communication channel 54. Such channel characteristics are shown as channel impulse responses $h_0$, 108 and $h_1$, 110.

The output of summers 100 and 102 are antenna element signals 112 and 114. These signals are modulated and amplified and coupled to antenna elements 116 and 118 of an antenna array.

With reference now to subscriber unit 56, subscriber antenna 120 receives signals from antenna elements 116 and 118. Although not shown in FIG. 1, signals received by subscriber antenna 120 are down converted and coupled to mode detector 122 and despreaders 124 and 126. Despreaders 124 and 126 despread the received signal by multiplying the signal by spreading codes $W_0$ and $W_1$, wherein both multipliers are followed by an integration operation, as shown. Despread signals 128 and 130, which are output from despreaders 124 and 126, are coupled to multipliers 132 and 134. Multipliers 132 and 134 multiply despread signals 128 and 130 by RAKE weight $g_0$ and $g_1$, respectively.

RAKE weights $g_0$ and $g_1$ are computed by RAKE weight computers 136 and 138. RAKE weight computation may be implemented by calculating the complex conjugate of the channel impulse response. When the adaptive array mode is enabled, mode detector 122 sends a signal to pilot selectors 140 and 142 to select the auxiliary pilot for RAKE weight computers 136 and 138. The RAKE weight computers then use the auxiliary pilot to calculate the complex conjugate of the composite channel between each element 116 and 118 and the subscriber's antenna 120. This composite channel response includes impulse responses $h_0$ and $h_1$, as shown at reference numerals 108 and 110.

If the adaptive array mode in base transmitter 52 is not enabled, RAKE weight computers 136 and 138 use pilots $P_0$ and $P_1$ selected by pilot selectors 140 and 142 in order to compute complex conjugate impulse responses of individual channels from elements 116 and 118, as indicated by $h_0$ and $h_1$.

The reason for selecting different pilots for different modes of operation is that the auxiliary pilot is present in the signal from both antennas 116 and 118 while the element pilots, $P_0$ and $P_1$, are only present on one of the antenna elements 116 and 118.

When mode detector 122 detects that base transmitter 52 has enabled an adaptive array mode, mode detector 122 causes pilot selector 140 and 142 to select the auxiliary pilot as a reference for RAKE weight computers 136 and 138. When mode detector 122 detects that the adaptive array mode is not enabled, mode detector signal 144 causes pilot selectors 140 and 142 to select element pilots $P_0$ and $P_1$ as the references provided to RAKE weight computers 136 and 138.

Output from multipliers 132 and 134 are coupled to demultiplexer 146. As shown in FIG. 1, demultiplexer 146 receives two inputs and produces a single output.

In order to support an adaptive array mode in base transmitter 52, subscriber unit 56 includes channel measurement and feedback processor 149. Channel measurement and feedback processor 149 measures the characteristics of channels 108 and 110, which together may be referred to as a composite channel between base transmitter 52 and subscriber unit 56, and then appropriately formats messages to send back to a base receiver. The information contained in such messages are used to determine the operations performed in filters 86 and 88, which may include calculating the values of $V_0$ and $V_1$.

The output of demultiplexer 146 is coupled to decoder 148, which decodes the data that was originally transmitted from traffic channel 58.

Figure 2:
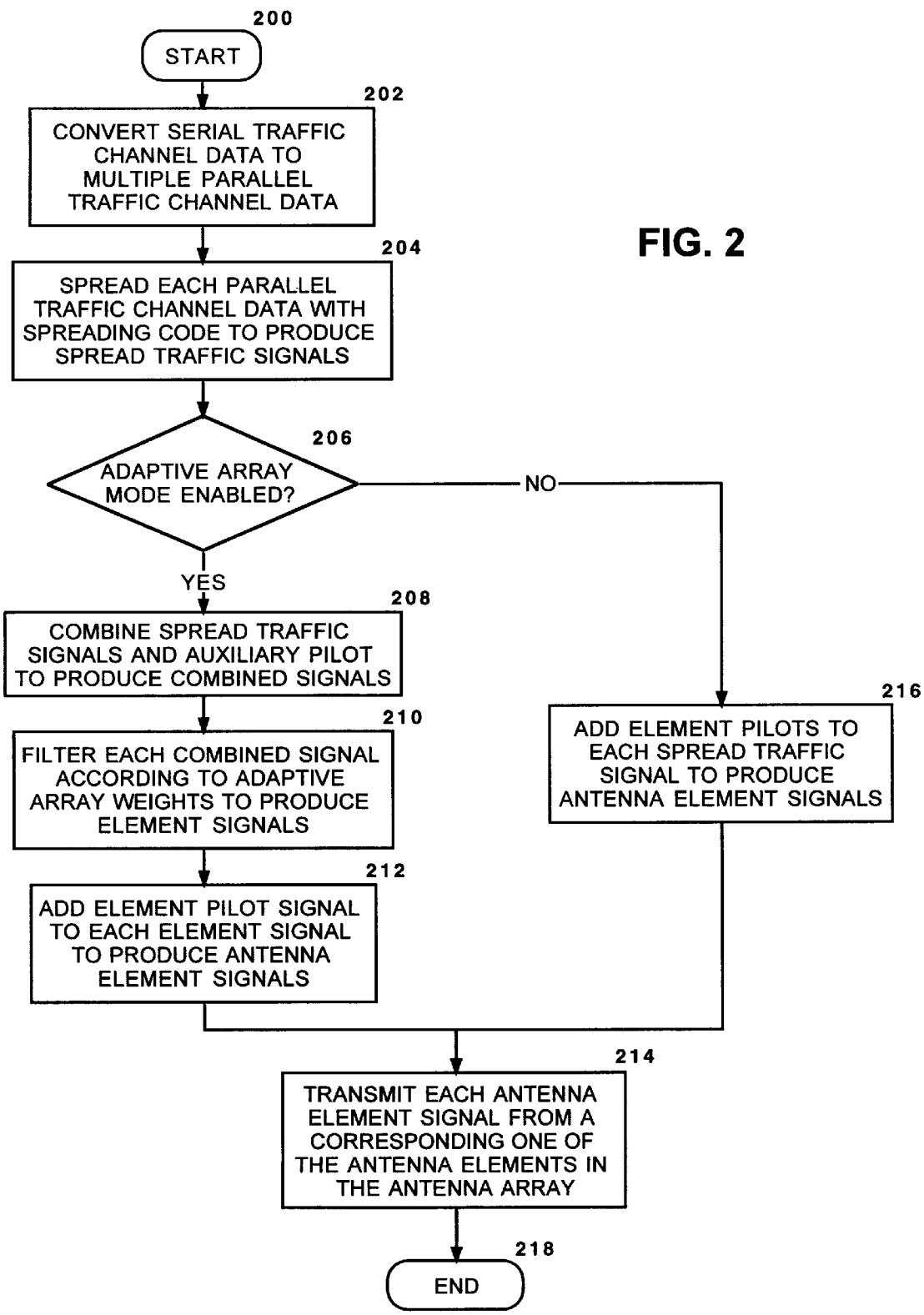
FIG. 2 a high-level flowchart illustrating the process of producing antenna element signals in accordance with the method and system of the present invention.

With reference now to FIG. 2, there is depicted a high-level flowchart that illustrates the process of producing antenna element signals for transmitting a traffic channel from a plurality of elements in an antenna array in accordance with the present invention. As illustrated, the process begins at block 200, and thereafter passes to block 202 wherein the process converts a serial traffic channel data into multiple parallel traffic channel data. This process may be implemented using a multiplexer, such as multiplexer 62 shown in FIG. 1. Note that the data rate of the parallel traffic channel data will be the data rate of the serial traffic channel data divided by the number of multiple parallel traffic channels. Thus, the multiple parallel traffic channel data is at most half the rate of the serial traffic channel data.

Next, the process spreads each parallel traffic channel data with a spreading code, as illustrated at block 204. This spreading operation may be implemented as shown in FIG. 1 with spreaders 68 and 70. In a preferred embodiment, the spreaders use unique spreading codes, or spreading codes that are distinct from one another. Furthermore, these spreading codes are orthogonal sequences which allow the spread data to be recovered in a receiver.

Next, the process determines whether or not an adaptive array mode is enabled, as depicted at block 206. Preferably the adaptive array mode is enabled when reliable feedback is available from the subscriber unit, and when the antenna adaptation rate is fast enough to adapt to the rate at which the channel changes.

If the adaptive array mode is enabled, the process of the embodiment shown then combines a user pilot, which may be called an auxiliary pilot, and each parallel traffic channel data to produce combined signals, as illustrated at block 208. In one of the simplest embodiments of the present invention, the combined signals are produced by splitting the output signal of a summer, wherein the summer adds all the parallel traffic channel data and the auxiliary pilot. Example of such summers are summers 78 and 82 in FIG. 1. In other more complicated embodiments of the present invention, the combining may be implemented by appropriately weighting the parallel traffic channel data and adding the weighted data as shown and described in relation to FIGS. 5, 6, and 7. Such weighting and adding steps may be implemented with matrix multiplication. (See FIG. 7 and related description.)

Although the process shown in FIG. 2 combines a user or auxiliary pilot signal in block 208, some embodiments of the present invention may not require such an auxiliary pilot signal. Embodiments of communications systems that do not combine an auxiliary pilot signal may synthesize a pilot signal in the receiver in the subscriber unit in order to provide a reference for signal demodulation. For further information describing pilot signal synthesis in a subscriber unit see U.S. Pat. No. 6,067,324; filed: Jun. 30, 1998; entitled: "Method and System for Transmitting and Demodulating a Communications Signal Using an Adaptive Antenna Array in a Wireless Communication System", which is incorporated herein by reference.

Next, in the embodiment shown, the process filters the combined signals according to adaptive array weights to produce element signals, as depicted at block 210. This step of filtering may be implemented with a digital filter, which is some cases may be a one-tap, zero-delay filter, which is equivalent to a multiplier. The adaptive array weights used by the filters are derived from measurements or estimations of the channel impulse responses of channels from each element of the antenna array at the base to the subscriber antenna. These array weights may be calculated as described in the above-identified referenced U.S. Pat. No. 6,067,324; filed: Jun. 30, 1998; entitled: "Method and System for Transmitting and Demodulating a Communications Signal Using an Adaptive Antenna Array in a Wireless Communication System."

After the combined signals have been filtered, the process adds an element pilot signal to each element signal to produce antenna element signals, as illustrated at block 212. Each element pilot signal is different from every other element pilot signal so that the channels can be identified from the perspective of the subscriber unit. The subscriber unit may measure these element pilot signals to determine the channel impulse responses of the channels between antenna elements and the subscriber's antenna.

After adding the pilot signal, the process transmits the antenna element signals by modulating and amplifying the signals, and coupling such signals to corresponding antenna elements in the antenna array, as depicted at block 214.

Referring again to block 206, if the adaptive antenna array mode is not enabled, the process adds element pilots to each spread parallel traffic channel to produce antenna element signals, as illustrated at block 216. Thereafter, the process transmits the antenna element signals as shown at block 214.

Although the process is shown terminating at block 218, the process is preferably repeated for each group of bits input to base transmitter 52 from traffic channel 58. Thus, the process should be understood as a continuous process implemented in base transmitter 52, wherein traffic channel data is continuously received into the transmitter along with measurements and calculations needed to compute adaptive array weights 90 and 92 in adaptive array processor 76, as shown in FIG. 1.

Figure 3:
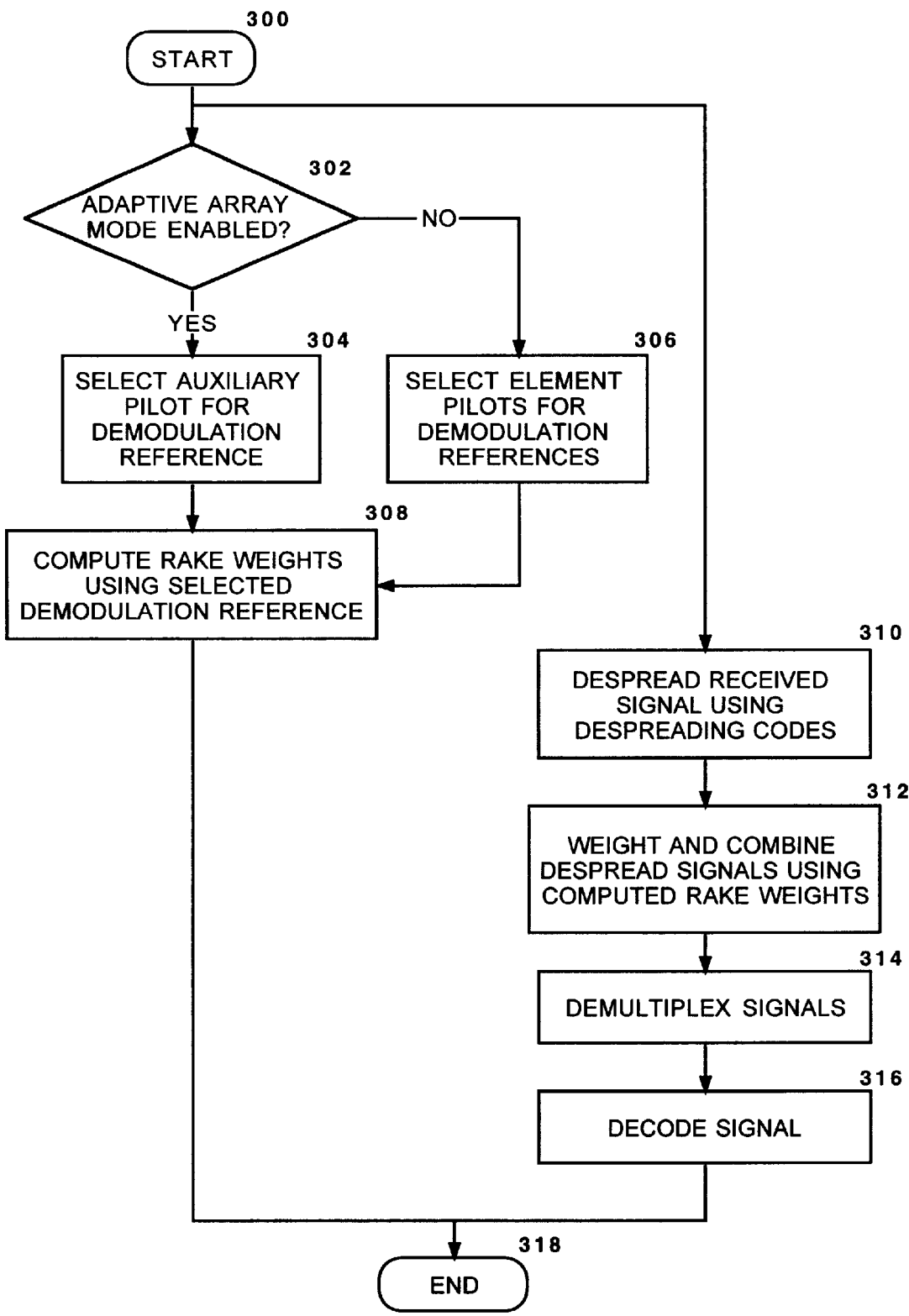
FIG. 3 is depicted a high-level flowchart illustrating the process of demodulating a signal in a subscriber unit wherein the signal has been transmitted according to the present invention.

With reference now to FIG. 3, there is depicted a high-level flowchart illustrating the process of demodulating a signal in a subscriber unit wherein the signal has been transmitted according to the present invention. As illustrated, the process begins at block 300 and thereafter passes to block 302 wherein the process determines whether or not the adaptive array mode is enabled. The process may determine whether or not the adaptive array mode is enabled by several techniques, some of which are discussed below. In the system shown in FIG. 1, mode detector 122 makes this determination.

If the adaptive array mode is enabled, the process then selects the auxiliary pilot for a demodulation reference to be used in the demodulator in the subscriber unit, as illustrated at block 304. The auxiliary pilot may be generated by known methods of producing a sequence of coefficients, where such sequence is specified by a message or other signaling from base transmitter 52.

If the adaptive array mode is not enabled, the process selects the elements pilots for demodulation references in the subscriber unit, as depicted at block 306. The element pilots may be generated in a manner similar to the generation of the auxiliary pilot. The element pilots are known sequences which are specified by a message or other signal from base transmitter 52.

The steps depicted at blocks 302–306 may be implemented as shown in FIG. 1 with mode detector 122 coupled to pilot selectors 140 and 142.

After a demodulation reference or references have been selected, the process computes RAKE weights using the selected demodulation reference or references, as illustrated at block 308. RAKE weights are typically the complex conjugate of the coefficients of the channel impulse response with the greatest magnitude.

In FIG. 3, blocks 302–308 depict a process of computing RAKE weights which may be executed in parallel with the steps of decoding the signal, which are shown at blocks 310–316.

Turning now to the decoding steps, the process begins by despreading the received signal using two or more despreading codes, as depicted at block 310. The number of despreading codes used is the same as the number of spreading codes used in spreading processor 60 in FIG. 1. Also shown in FIG. 1 are despreaders 124 and 126 which may be used to implement this despreading step.

The despread signals are weighted and combined using the computed RAKE weights, as illustrated at block 312. The RAKE weights are computed as shown and described at block 308. This weighting and combining step compensates for the effects of the communication channel 54, through which the received signal has passed.

Next, the process demultiplexes the signals, as depicted at block 314. This demultiplexing step takes two or more data inputs and combines them into a single serial output. In FIG. 1, this process may be implemented with demultiplexer 146, which receives two inputs and combines them into a single output. This process may be thought of as the opposite of the process of multiplexing in base transmitter 52, as shown at block 202 in FIG. 2, and implemented with multiplexer 62 in FIG. 1.

The demultiplexed signal is then decoded, as illustrated at block 316. The decoding process may be implemented with commonly used error correcting code decoders, including a soft decision Viterbi decoder.

The process of decoding a received signal according to the present invention is terminated at block 318. However, the process shown in FIG. 3 is designed to be a continuous process of receiving, despreading, weighting, demultiplexing, and decoding signals from base transmitter 52.

Figure 4:
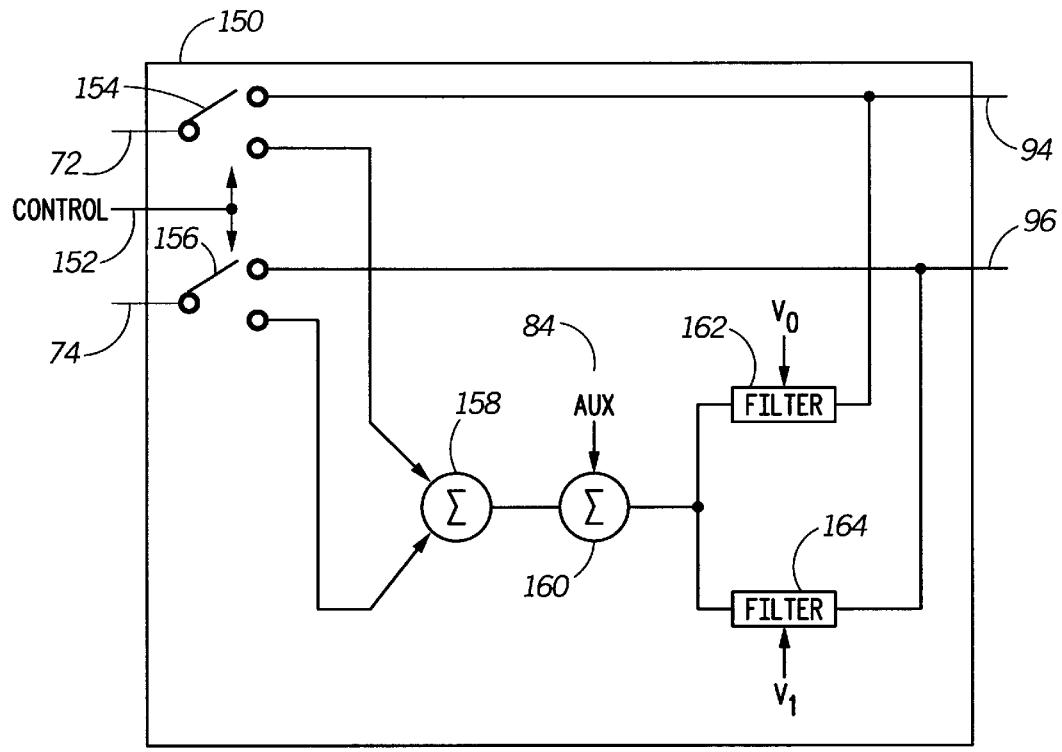
FIG. 4 depicts an alternate embodiment of an adaptive array processor in FIG. 1 in accordance with the method and system of the present invention.

With reference now to FIG. 4, there is depicted an alternate embodiment of adaptive array processor 76 in FIG. 1. Adaptive array processor 150 shown in FIG. 4 may be used in place of adaptive array processor 76 in FIG. 1. As shown, spread traffic signals 72 and 74 are input into adaptive array processor 150. Control signal 152 indicates whether or not the adaptive array mode is enabled in base transmitter 52. When the adaptive array mode is not enabled, switches 154 and 156 are in the upper position to send spread traffic signals 72 and 74 to the outputs of adaptive array processor 150.

If the adaptive array mode is enabled in transmitter 52, switches 154 and 156 are in the lower position to couple spread traffic signals 72 and 74 to summer 158, which adds the signals together. The output of summer 158 is coupled to summer 160 wherein an auxiliary pilot may be added to the combined signals from summer 158.

The output of summer 160 is then split and filtered by filters 162 and 164 in a manner similar to that described with reference to filters 86 and 88 in FIG. 1.

Finally, the output of filters 162 and 164 are output from adaptive array processor 150 as element signals 94 and 96. Thus, adaptive array processor 150 operates the same way as adaptive array processor 76 except that the adaptive array processing may be enabled and disabled by control signal 152. When adaptive array processor 150 is disabled, base transmitter 52 operates in an orthogonal transmit diversity mode.

Figure 5:
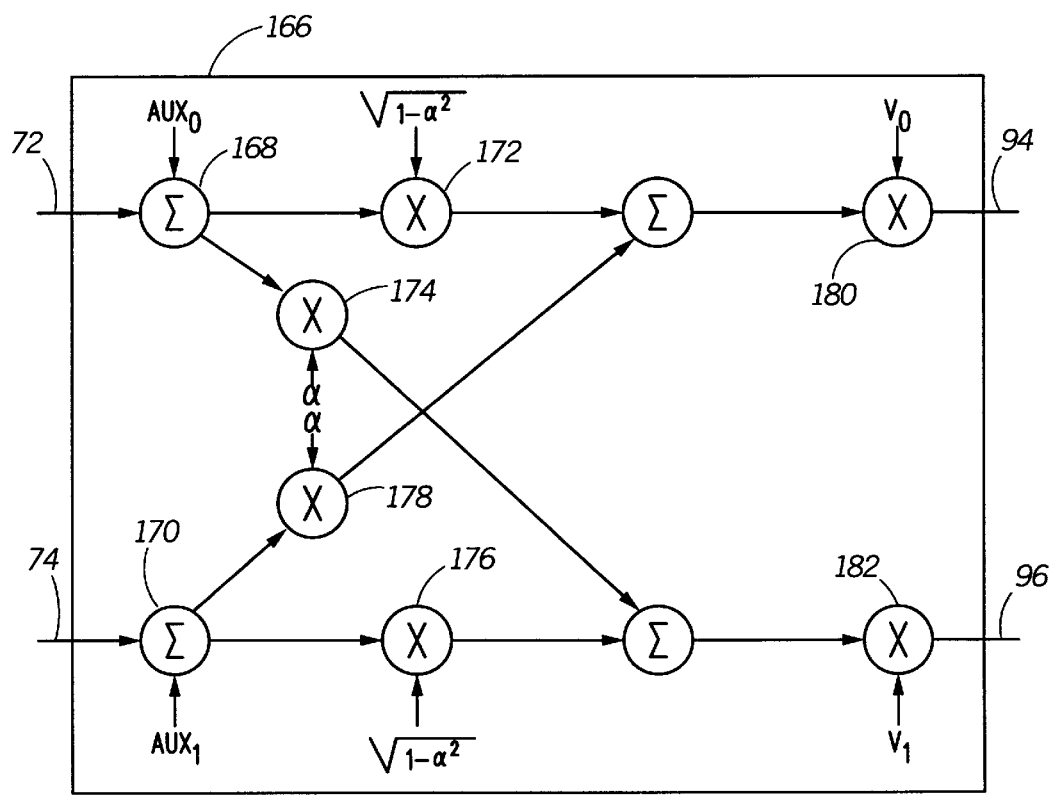
FIG. 5 depicts yet another alternate embodiment of an adaptive array processor in accordance with the method and system of the present invention.

With reference now to FIG. 5, there is depicted yet another alternate embodiment of adaptive array processor 76. As illustrated, adaptive array processor 166 receives spread traffic signals 72 and 74 as inputs to summers 168 and 170. Summers 168 and 170 add auxiliary pilots $AUX_0$ and $AUX_1$ to spread traffic signals 72 and 74. Pilots $AUX_0$ and $AUX_1$ are different because spread traffic signals 72 and 74 are not combined by simply summing the two signals together as shown in FIGS. 1 and 4—in this embodiment of adaptive array processor 166, spread traffic signals 72 and 74 are combined by adding a portion of the signal in one path to the signal in the other path. This portion is determined by the coefficient $\alpha$ in FIG. 5. Thus, multipliers 172 and 174 divide the signal power output by summer 168, wherein a portion of the signal power proceeds on a path through adaptive array processor 166 to become element signal 94, and another portion of the signal power output by summer 168 proceeds along a path toward element signal 96. Stated another way, the fraction of the signal power going to each output of adaptive array processor 166 is determined by the value of $\alpha$, wherein $\alpha$ varies from 0 to the reciprocal of the square root of 2.

Similarly, multipliers 176 and 178 divide the signal power output by summer 170 between the branches of adaptive array processor 166 that produce element signals 94 and 96.

Multipliers 180 and 182, which are simple implementations of filters, are used to modify the combined signals according to adaptive array weights to produce element signals 94 and 96. These filters operate similar to filters 86 and 88 in FIG. 1. As shown, these filters are zero delay, single tap filters.

It should be noted that when the value of $\alpha$ is equal to 0, and adaptive array weights $V_0$ and $V_1$ at multipliers 180 and 182 are equal to 1, adaptive array processor 166 is figured so that base transmitter 52 operates in an orthogonal transmit diversity mode. In this case, adaptive array processor 166 behaves as though switches 154 and 156 in adaptive array processor 150 in FIG. 4 have been set to the upper position to pass traffic signals 72 and 74 directly through to the outputs of element signals 94 and 96.

If $\alpha$ is set equal to the reciprocal of the square root of 2, and calculated adaptive array weights $V_0$ and $V_1$ are used in multipliers 180 and 182, adaptive array processor 166 is configured so that base transmitter 52 operates in an adaptive array mode. In this configuration, adaptive array processor 166 behaves like adaptive array processor 150 with switches 154 and 156 set in the lower position to couple spread traffic signals 72 and 74 through summer 158 and filters 162 and 164.

If $\alpha$ is set to a value between 0 and the reciprocal of the square root of 2, adaptive array processor 166 is configured so that base transmitter 52 operates in a mixed mode—a mode that is not strictly an orthogonal transmit diversity mode nor an adaptive array mode. In this mixed mode base transmitter 52 exhibits characteristics of both modes. If the value of $\alpha$ is allowed to vary between its extremes, base transmitter 52 may smoothly transition between orthogonal transmit diversity mode and adaptive array mode. This smooth transition may allow base transmitter 52 to slowly disable the adaptive array mode in proportion to the degradation of the quality of the feedback data, which typically degrades as the speed of the subscriber unit increases.

Because adding auxiliary pilots such as a $AUX_0$ and $AUX_1$ consumes power that might otherwise be used to transfer user data, not adding $AUX_0$ and $AUX_1$ in adaptive array processor 166 is a desirable goal. However, $AUX_0$ and $AUX_1$ are added because they provide a demodulation reference in subscriber unit 56. Without this demodulation reference, the subscriber unit must know adaptive array weights $V_0$ and $V_1$ in order to properly demodulate the received signal. Therefore, if $AUX_0$ and $AUX_1$ are not used, subscriber unit 56 must be able to calculate adaptive array weights $V_0$ and $V_1$, which may be accomplished mathematically by analyzing the joint statistical characteristics of the signals output by despreaders 124 and 126 in combination with the knowledge of the value of a, which describes how spread traffic signals 72 and 74 are combined.

Figure 6:
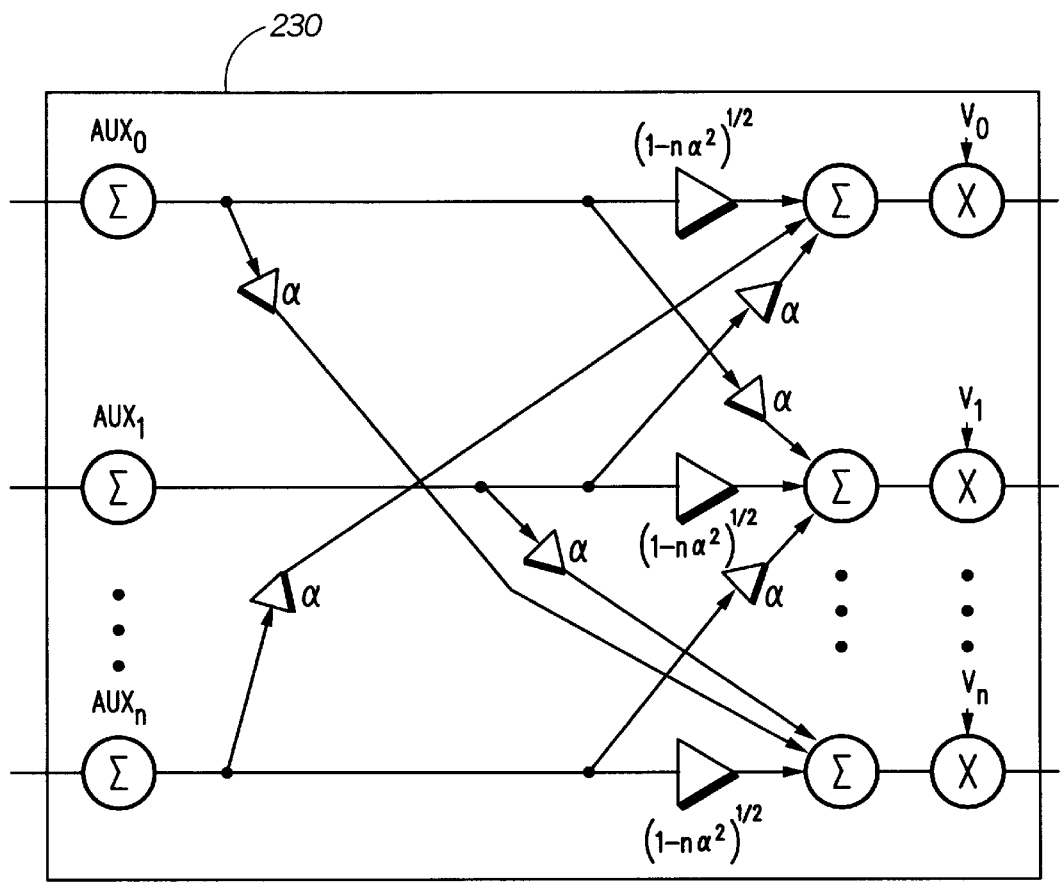
FIG. 6 depicts yet another embodiment of an adaptive array processor in accordance with the method and system of the present invention.

With reference now to FIG. 6, there is depicted yet another embodiment of adaptive array processor 76. As shown, adaptive array processor 230 includes n+1 inputs, in contrast with the two inputs of adaptive array processors 76, 150 and 166. Within adaptive array processor 230 power is split in equal portions from each of the n paths, and each split portion is added to another one of the n paths. The value of $\alpha$ sets the ratio of power in bits in other paths that are combined with the power of the bit input to a particular path. The portions of energy split or diverted from an input path and combined with another path are all equal.

The values of $\alpha$ in adaptive array processor 230 range from zero to the reciprocal of the square root of n+1, as depicted in the range shown in FIG. 6. When $\alpha$ is equal to zero, adaptive array processor is configured so that base transmitter 52 operates in an orthogonal transmit diversity mode. When $\alpha$ is set equal to the reciprocal of the square root of n+1, adaptive array processor 230 is configured so that base transmitter 52 operates in an adaptive array mode. Therefore, when the value of α is at either extreme, adaptive array processor 230 operates similar to an n+1—input version of adaptive array processor 150, which may be switched between modes.

Figure 7:
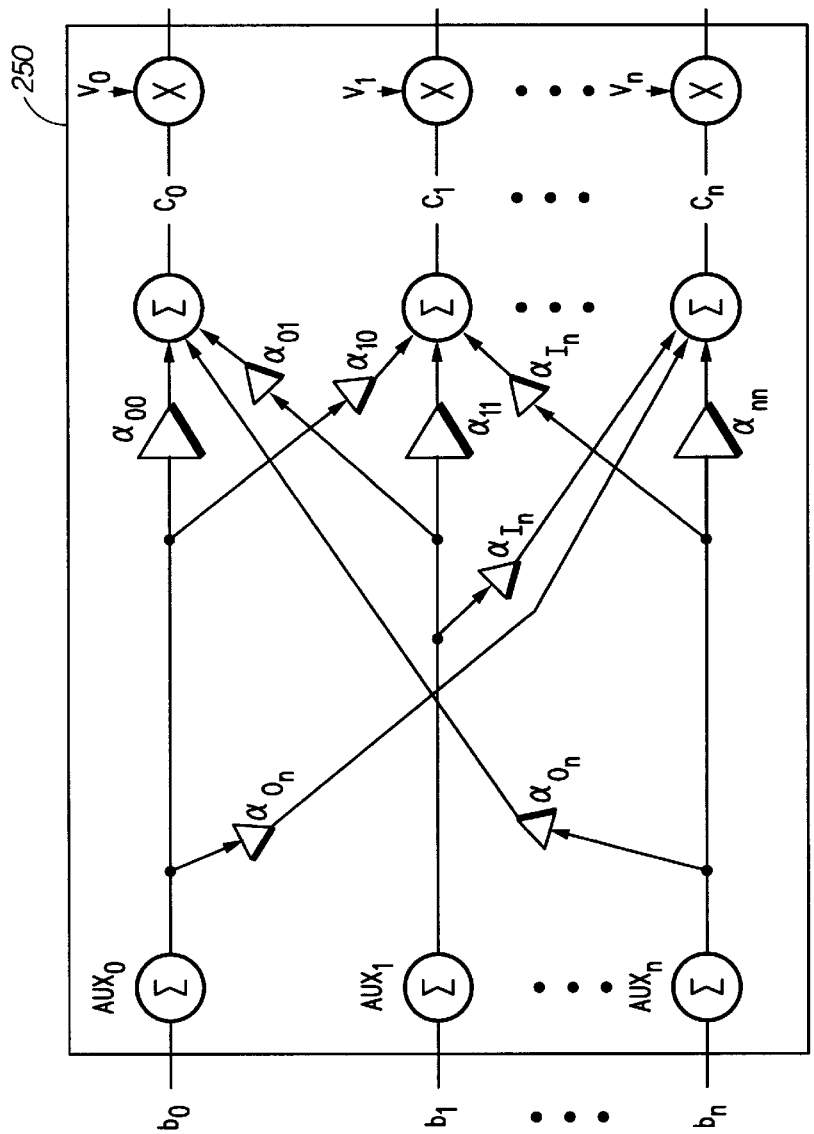
FIG. 7 there is depicts still another embodiment of an adaptive array processor in accordance with the method and system of the present invention.

With reference now to FIG. 7, there is depicted still another embodiment of adaptive array processor 76. As depicted, adaptive array processor 250 includes n+1 inputs for receiving spread traffic signals $b_0$–$b_n$. The difference between adaptive array processor 250 in FIG. 7 and adaptive array processor 230 in FIG. 6 is the ability of adaptive array processor 250 to split unequal portions of signal power to combine with other signal paths in the adaptive array processor. In adaptive array processor 230 in FIG. 6 the portions of energy split or diverted from an input path and combined with another path are all equal.

When adaptive array processor is set in an orthogonal transmit diversity mode, base transmitter 52 transmits a uniform level of power over an entire sector or antenna coverage area. When adaptive array mode is enabled, adaptive array processor 230 and base transmitter 52 transmit power unevenly over the sector, ideally with the maximum power being delivered to the subscriber unit.

Because the energy split or diverted from one path for combining with another selected path in adaptive array processor 250 may be independently selected, and because the phase at which various paths are combined may be individually selected, base transmitter 52 can transmit different spread bits with different codes in different amounts of power across different directions in a sector. This mode of operation is a further generalization of orthogonal transmit diversity and adaptive antenna transmission.

Note that as the number of paths or branches in adaptive array processor 76 increases above two paths, modification must be made in spreading processor 60, pilot processor 98, and subscriber unit 56. In spreading processor 60, multiplexer 62 must output n+1 branches or paths. Additional spreaders such as 68 and 70 must be added for each path. With regard to pilot processor 98, additional summers such as 100 and 102 may be needed for each path, along with new element pilot signals, such as element pilot signals 104 and 106. Additional antenna elements 116 and 118 may also be needed.

In subscriber unit 56, additional demodulation paths may be needed, wherein such paths include despreaders 124 and 126 and multipliers 132 and 134. Demultiplexer 146 must be able to demultiplex n+1 inputs.

Also note that in the embodiment in FIG. 1, the number of spread traffic signals 72 and 74 may or may not be equal to the number of element signals 94 and 96. For example, the number of spreading codes used need not be equal to the number of elements used in the antenna array.

With regard to mode detector 122 in FIG. 1, several methods may be used to detect whether or not the transmitter is transmitting in an adaptive array mode or not. One simply method includes sending a message from base transmitter 52 to subscriber unit 56. Another method that may be used is the detection of auxiliary pilot 84. For example, if the embodiment shown in FIG. 4 is used, adaptive array processor 150 adds an auxiliary pilot to element signals 94 and 96 when control signal 152 places switches 154 and 156 in the lower position to enable the adaptive array mode. When control signal 152 sets switches 154 and 156 to the upper position, an auxiliary pilot signal is not present in element signals 94 and 96. This would indicate to subscriber unit 56 that transmitter 52 is operating in the orthogonal transmit diversity mode.

The foregoing description of a preferred embodiment of the invention has been presented for the purpose of illustration and description. It is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A receiver for use in a wireless communication system, wherein the wireless communication system includes a transmitter that spreads data with multiple spreading codes, the receiver comprising:

a plurality of despreaders for despreading with multiple despreading codes corresponding to the multiple spreading codes in the transmitter;

a plurality of demodulators for demodulating outputs of the plurality of despreaders;

a demultiplexer for demultiplexing the outputs of the plurality of demodulators;

a decoder for decoding the output of the demultiplexer to produce received traffic channel data;

a pilot selector for selecting, in response to a control signal, a reference signal for use in the plurality of demodulators; and a mode detector for producing the control signal, the control signal being responsive to the transmitter transmitting in one of an orthogonal transmit diversity mode and an adaptive array mode.

2. The receiver according to claim 1 wherein the mode detector further comprises an auxiliary pilot detector.

* * * * *